Aug. 7, 1928.
H. H. WOLFE
1,679,801
DRAFT CONNECTION FOR CAR COUPLINGS
Filed Feb. 10, 1927   2 Sheets-Sheet 2
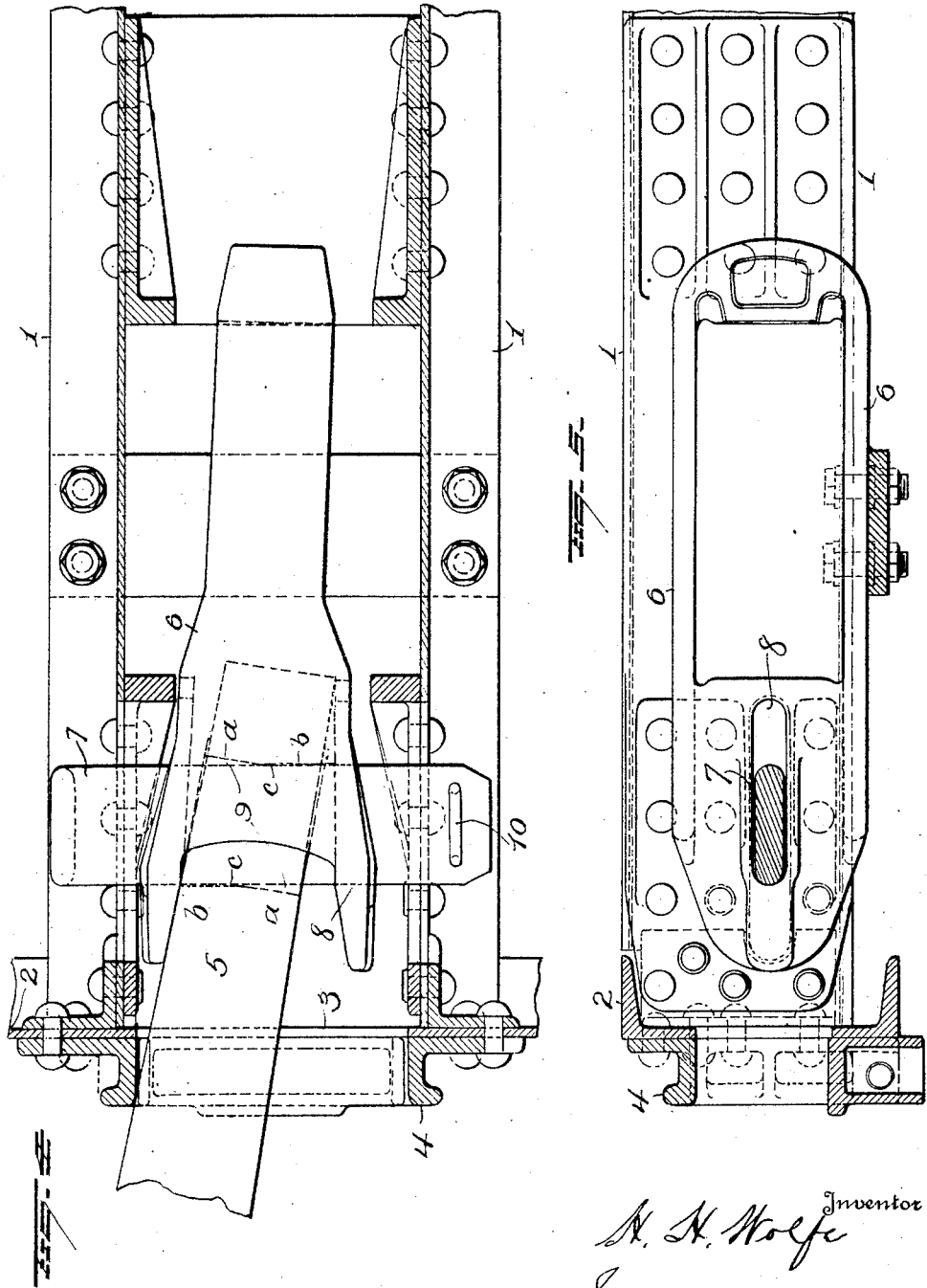

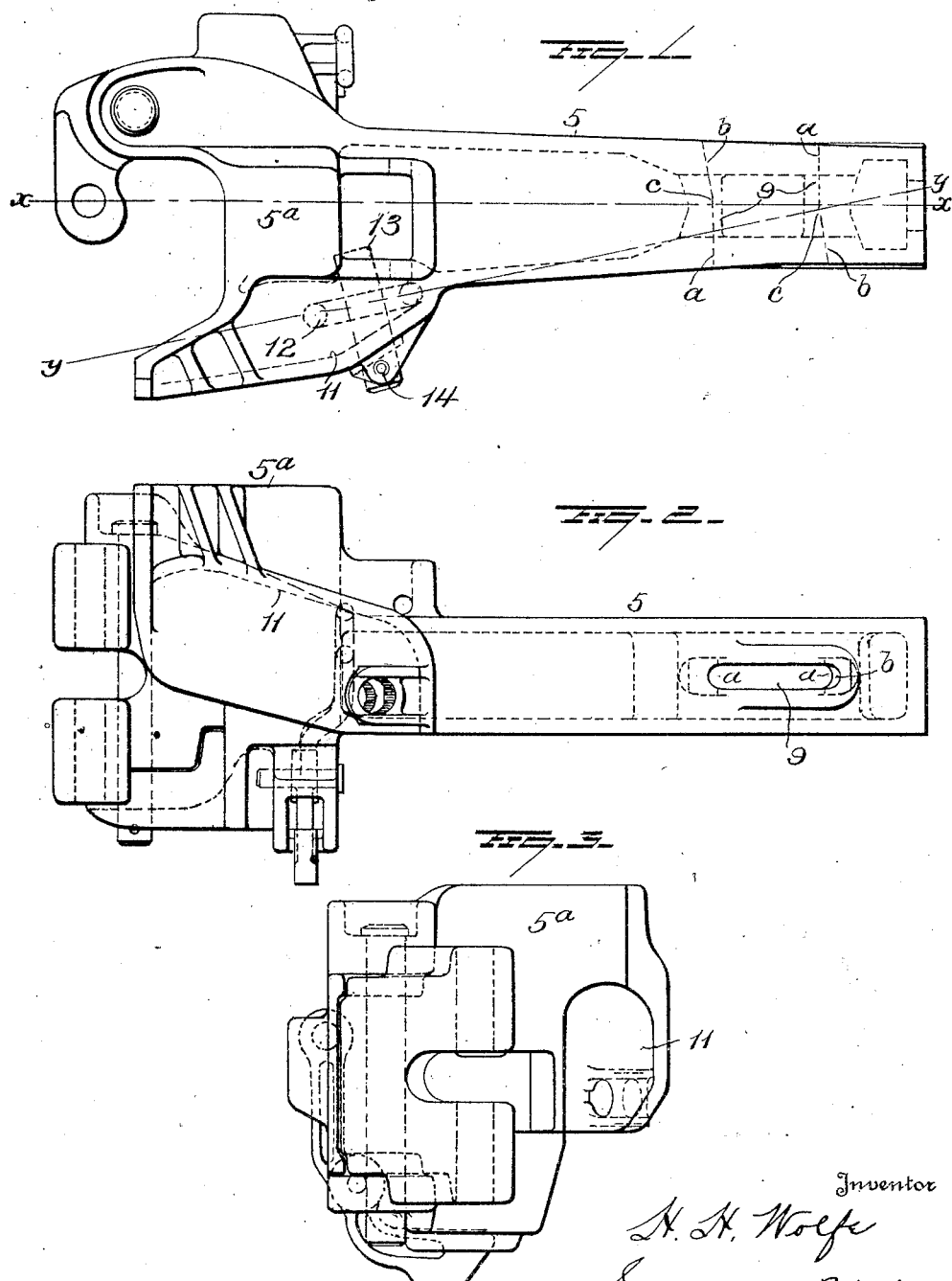

Patented Aug. 7, 1928.

1,679,801

UNITED STATES PATENT OFFICE.

HARRY H. WOLFE, OF COLUMBUS, OHIO, ASSIGNOR TO THE BUCKEYE STEEL CASTINGS COMPANY, OF COLUMBUS, OHIO.

DRAFT CONNECTION FOR CAR COUPLINGS.

Application filed February 10, 1927. Serial No. 167,262.

This invention relates to improvements in draft connections for car couplings, and particularly to the connection between the shank or draw-bar of the coupling head of an automatic coupling, with the draft yoke when said coupling head is adapted to receive transition coupling means at one side of the normal line of draft.

In order to apply many types of transition devices to an automatic coupling, it is desirable and necessary to offset the connection of the transition devices toward the guard arm of the coupling so as to clear the knuckle, leaving the operating parts of the coupling undisturbed.

The present invention contemplates flat bearings for the key which connects the shank or draw-bar with the draft yoke, said bearings for the key being so disposed that they will provide bearings to take the pull in two directions, viz, in the normal direction when two automatic couplings are coupled together, or in a direction at an angle to such normal line of draft as when transition devices between an automatic coupling and a hook coupling are employed, said two bearing faces for the key being, in effect, continuations of each other so that a rolling action of the draw-bar will take place when the draw head and its bar or shank are shifted laterally toward or from their normal line of draft, and so that practically the same amount of bearing for pulling will be afforded in either position in which the draw head and its shank or draw-bar may be disposed, as is provided in the key slot reinforcement heretofore employed.

In the accompanying drawings:—

Figure 1 is a plan view of an automatic coupling illustrating an embodiment of the invention;

Figure 2 is a side view;

Figure 3 is an end view;

Figure 4 is an enlarged view partly in plan showing the draft and end sills of a car partly in horizontal section, showing the lateral position of the coupling head and shank, and Figure 5 is a view of the structure shown in Figure 4 partly in side elevation and partly in vertical section, and the draw-bar omitted.

The draft sills of a car are indicated at 1, 1 and the end sill at 2; the latter being provided with an opening 3, reinforced as at 4 to accommodate the shank or draw-bar 5 of a draw head 5$^a$ of an automatic coupling. The draw-bar enters a draft yoke 6 and the latter may have connection with the draft sills in any approved manner. The shank or draw-bar 5 of the automatic coupling is connected with the yoke by means of a horizontally disposed key 7 (preferably elongated in cross section),—the yoke being provided at respective sides of its nose with slots 8 and the coupling shank or draw-bar with a slot 9 for the accommodation of said key, and suitable means, as at 10, may be provided to prevent displacement of the key.

In the embodiment shown in Figs. 1, 2 and 3 of the drawings, the coupling head 5$^a$ is provided in its guard arm side with a recess 11 open at its front end and at its bottom for the accommodation of transition coupling devices for connecting the automatic coupling with a hook-coupling. Any suitable form of transition connecting or coupling devices may be employed and in Figure 1 of the drawings, one link 12 of such devices is shown as being secured in the rear portion of the recess 11 by means of a pin 13, the latter being held against displacement by means of a key or rivet at 14.

During normal operation, when two automatic couplings are coupled, the line of draft will be through the longitudinal center of the draw-bar, but when an automatic coupling is connected with a hook coupling through the medium of devices connected with the automatic coupling at one side of the normal central draft line, the head and shank of the automatic coupling will swing laterally, so that a different line of draft will be provided. In order that a flat and adequate key bearing in the draw-bar shall be provided in either position which the automatic coupling and its draw-bar shall assume and in order that the same may have easy rolling movement from one position to the other, the construction of the slot 9 in the shank or draw-bar is as will be presently explained.

When the automatic coupling assumes the position shown in Figure 1, as when two automatic couplings are coupled, the pull or line of draft will be along the line $x$—$x$, but when the automatic coupling is connected, through transition devices, with a hook coupling, the pull or line of draft will be along the line *y—y*. In order that a flat bearing for the key 7 at the rear end of the slot 9 shall be insured in either position of the automatic coupling, that portion of the rear end wall of the slot 9 represented by the line *a* is made perpendicular to the line *x—x* and the line *b* is made perpendicular to the line *y—y*. The lines *a* and *b* are connected by arc *c* so that the coupling will move into its proper alinement with a sort of rolling action.

If desired the front end of the key slot 9 may have the same form as the rear end, but of course the lines *a* and *b* will be reversed in position, or the front end wall of the slot might be straight without affecting the operation of the improvements herein disclosed, it being understood that the length of the key slot is such as to permit shifting from the bearing line *a* to the bearing line *b* at the rear end of the slot.

It will be observed that in Figure 4 of the drawings, is shown the position of the coupling shank or draw-bar, the key and yoke when the pull or draft is transmitted through the off-center transition device, the pull being transmitted along the line *y—y* which coincides with the center line of the car.

In drawings I have shown the commonly used "cast steel draft yoke of vertical plane type" but it will readily be understood by those familiar with this art that any other type of draft yokes such as horizontal plane, and others with side members carrying slots for transverse key, could be applicable and it is understood therefore, I do not limit my claims in any way to the particular form of draft yoke shown in drawings.

Having fully described my invention what I claim as new and desire to secure by Letters-Patent, is:—

1. In draft means for railway cars, the combination with a draft yoke adapted to receive a transverse key, of a draw-bar having a key slot, a key passing transversely through the yoke and through the slot in the draw-bar, the rear end wall of said slot providing two pulling faces for the key, disposed at an angle to each other.

2. In draft means for railway cars, the combination with a draft yoke adapted to receive a transverse key, of a draw-bar having a key slot, a key passing transversely through the yoke and through the slot in the draw bar, the rear end wall of said slot providing two flat approximately contiguous pulling faces for the key, said pulling faces being disposed at an angle to each other.

3. In draft means for railway cars, the combination with a draft yoke adapted to receive a transverse key, of a draw-bar having a key slot, a key passing transversely through the yoke and through the slot in the draw bar, said slot providing bearing faces for the key, said bearing faces being disposed at an angle to each other, one of said bearing faces being perpendicular to a line passing through the longitudinal center of the draw-bar, and the other bearing face being perpendicular to a line extending laterally and forwardly from said longitudinal center of the draw-bar.

4. In draft devices for railway cars, the combination with a draft member adapted to receive a transverse key, of a draw head having a point of attachment for transition devices at one side of the normal draft line of the draw-head, a shank or draw-bar projecting rearwardly from said draw head and having a key slot, a key passing through said draft member and the key-slot in the draw-bar, an end wall of said slot providing two bearing faces for the key, one of said bearing faces being perpendicular to the longitudinal center line of the draw-bar and the other bearing face being perpendicular to a line passing the point of connection of the transition devices with the draw-head and intersecting the longitudinal center line of the draw-bar in rear of the slot in the latter.

5. In draft devices for railway cars, the combination with a draft member adapted to receive a transverse key, of a draw-head having a point of attachment for transition devices at one side of the normal draft line of the draw-head, a shank or draw-bar projecting rearwardly from said draw-head and having a key slot, a key passing through said draft member and the key-slot in the draw bar, each end wall of said slot providing two bearing faces for the key, one of said bearing faces at each end of the slot being perpendicular to the longitudinal center line of the draw bar and the other bearing face at each end of the slot being perpendicular to a line passing the point of connection of the transition devices with the draw-head and intersecting the longitudinal center line of the draw-bar in rear of the slot in the latter.

In testimony whereof, I have signed this specification.

HARRY H. WOLFE.